United States Patent Office 3,620,097
Patented Nov. 16, 1971

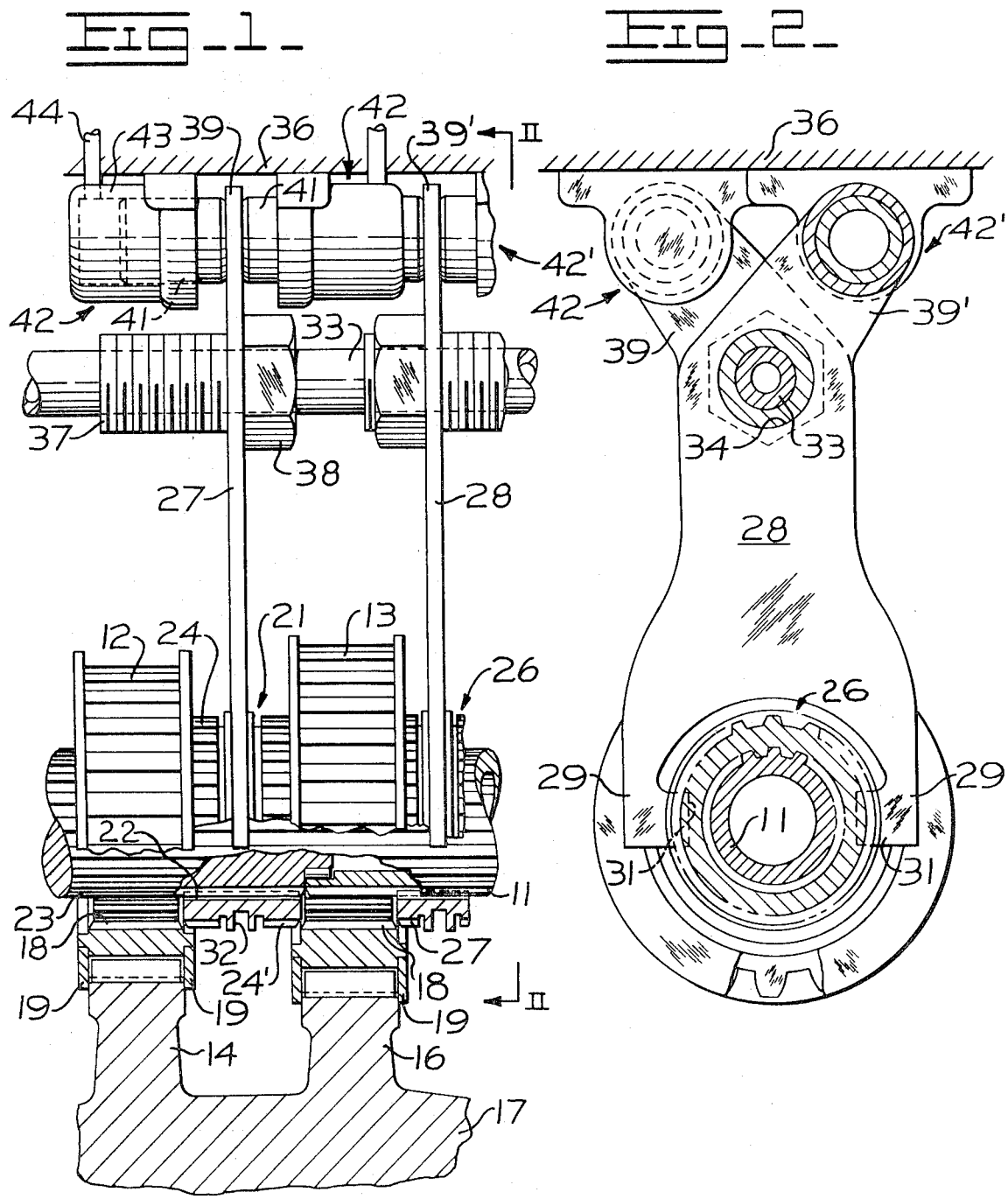

3,620,097
SHIFT FORK MECHANISM FOR DRIVE TRANSMISSIONS
Charles H. Herr, Peoria, Ill., assignor to Caterpillar Tractor Co., Peoria, Ill.
Filed Dec. 15, 1969, Ser. No. 887,803
Int. Cl. G05g 9/00
U.S. Cl. 74—473                                                                     4 Claims

ABSTRACT OF THE DISCLOSURE

Shifting of clutch collars within a multiple speed ratio gear box is accomplished with simplified shift forks which are flat members slidable along a single fixed shaft by fluid operated cylinders in response to fluid control signals. All shift forks are of identical configuration and are interchangeable to provide a compact system which can be economically manufactured and repaired.

BACKGROUND OF THE INVENTION

This invention relates to drive transmission for powered vehicles and the like and more particularly to shift fork mechanism for manipulating clutches within a transmission to realize selected drive ratios through the gearing system thereof.

Transmissions of the type having a number of ratio gears and clutch means for selecting different power paths through the gearing to realize different speed ratios require mechanism for engaging and disengaging appropriate ones of the clutches in the course of a shift. In transmissions of the type to which the invention relates, the clutches are customarily annular elements which are moved in an axial direction to engage or disengage associated gears, shafts or the like. This clutch manipulation is accomplished through shifting forks which extend into the gear system to move appropriate ones of the clutch elements in response to the operator's manipulation of a gear shift lever.

As heretofore constructed, the shifting forks and the mechanism for supporting and manipulating the forks has been undesirably complex and has added considerably to the general bulk, complication and cost of the transmission. Such forks have generally been forgings each having a specialized shape unique to its particular position in the transmission. A separate shaft has generally been needed to support and manipulate each shift fork together with complex and bulky mechanism for translating the operator's manipulation of the gear shift lever into the appropriate shift fork movements.

SUMMARY OF THE INVENTION

The present invention reduces bulk, complexity and manufacturing and repair costs in a transmission by controlling a plurality of clutches with shift forks having a single simplified configuration and by providing a simple and compact means for supporting and manipulating the shift forks.

Accordingly, it is an object of this invention to provide more compact and economical mechanisms for manipulating clutches within a multiple speed ratio drive transmission.

It is another object of this invention to provide for a simplified shift fork configuration for a transmission wherein the shift forks for a plurality of clutches therein are of uniform configuration and are interchangeable.

The invention together with further objects and advantages thereof will best be understood by reference to the following description of a preferred embodiment in conjunction with the accompanying drawings.

DESCRIPTION OF THE DRAWING

In the accompanying drawing:

FIG. 1 is an axial section view of a portion of a vehicle transmission showing certain of the shift gears and associated clutches thereof together with shift forks and support and control mechanism for operating the shift forks, and FIG. 2 is a partial cross-section view of the transmission, taken along line II—II of FIG. 1, further illustrating the structure of the shift forks and related mechanism.

DESCRIPTION OF A PREFERRED EMBODIMENT

The invention is applicable to a variety of transmission configurations wherein gears or gears and shafts are selectively clutched together to establish drive ratios. Since many transmission configurations of this kind are known to the art, the present description will be confined to those parts of a transmission which coact directly with the shift fork mechanism.

Referring now to FIGS. 1 and 2 of the drawing, a transmission to which the invention may be applied may have a mainshaft 11 encircled by a number of mainshaft gears of which two such gears 12 and 13 are shown in the drawing. Gears 12 and 13 mesh with and are supported and driven by gears 14 and 16 respectively formed integrally on countershafts 17. Countershafts 17 are driven from the transmission input by means well understood within the art, and to avoid obscuring elements of the shift fork mechanism, only a single one of the countershafts 17, displaced from its preferred angular position to one side of the mainshaft 11, is shown in the drawing.

The ratios of the diameters of the gear pair 12 and 14 differs from that of the gear pair 13 and 16 so that for a fixed speed of countershaft 17, differing speeds of the mainshaft 11 may be realized by clutching a selected one of the mainshaft gears 12 and 13 to the mainshaft.

To provide for selective engagement and disengagement of each gear 12 and 13 from mainshaft 11, the two gears are radially spaced from the mainshaft and carry internal teeth 18 and 18' respectively. The mainshaft gears 12 and 13 are held against axial movement by annular flanges 19 which extend radially therefrom on either side of the teeth of countershaft gears 14 and 16. Flanges 19 may, for example, be electron beam welded to the rims of the mainshaft gears.

To selectively clutch either gear 12 or gear 13 to mainshaft 11, a cylindrical clutch collar 21 is disposed coaxially on mainshaft 11 between the two gears and has internal splines 22 engaged with splines 23 of the mainshaft whereby the clutch collar is slidable along the mainshaft but constrained for rotation therewith. Clutch collar 21 carries a first set of external teeth 24 for engagement with the internal teeth 18 of mainshaft gear 12 and a second set of external teeth 24' at the opposite end for engagement with the internal teeth 18' of mainshift gear 13. Thus, if clutch collar 21 is shifted leftwardly as viewed in FIG. 1, gear 12 is engaged with mainshaft 11 while if the clutch collar is shifted rightwardly, gear 13 is engaged thereto and gear 12 is disengaged.

Transmissions of this general type normally employ several clutch means in order to achieve the desired number of speed ratios and for purposes of illustration, an additional such clutch collar 26 is shown in FIGS. 1 and 2, it being understood that in practice a still greater number of clutches will generally be employed in a given transmission. Clutch collar 26 is also disposed coaxially around mainshaft 11 and situated on the opposite side of gear 13 from clutch collar 21. Collar 26 has external teeth 27 for engaging with the internal teeth of gear 13 when the clutch collar is shifted leftwardly as viewed in FIG. 1. In this particular transmission, the clutch collar 26 connects with the transmission output and is not splined to the mainshaft 11 but is engaged with gear 13 simultaneously with engagement of clutch collar 21 therewith for the purpose of deriving output torque from the mainshaft through the clutch collar 26.

In order to manipulate the two clutch collars 21 and 26, shift forks 27 and 28 respectively are associated therewith. Both such shift forks 27 and 28 have an identical configuration although one is oriented oppositely from the other as will hereinafter be discussed. Each shift fork 27 and 28 is a flat plate member having a bifurcated lower end forming two tangs 29 which extend on opposite sides of the associated clutch collar and which turn inwardly for a short distance at the extremities 31 to enter a groove 32 around the central portion of the associated clutch collar 27 or 28. Each shift fork 27 and 28 extends upwardly from the associated clutch collar at right angles to the axis thereof and thus each clutch collar may be shifted axially on mainshaft 11 as desired by applying an appropriate force to the upper end of the associated shift fork.

To support the several shift forks of the transmission such as forks 27 and 28, a single fixed shaft 33 extends above the mainshaft 11 in parallel relationship therewith and each such shift fork has a threaded opening 34 near the upper end through which the shaft extends. Openings 34 of the shift forks are of larger diameter than shaft 33 and an externally threaded sleeve 37 is threadably engaged within the opening 34 to mount the associated shift fork on the shaft 33 for sliding motion therealong. A lock nut 38 on each such sleeve 37 bears against one side of the associated shift fork.

To provide for manipulation of the forks, each such fork 27 and 28 has an angled extension 39 which extends upwardly from opening 34 between plungers 41 of an associated pair of air operated actuator units 42. Each actuator unit 42 has a cylinder 43 secured to the transmission housing 36 and plunger 41 is slidably disposed in the cylinder and projects from one end thereof to contact extension 39 of the associated shift fork 27 or 28. The end of cylinder 43 opposite from the projecting portion of plunger 41 is communicated with a pneumatic shifting control system through a suitable air conduit 44 whereby the admission of high pressure air to cylinder 43 urges plunger 41 outwardly to exert a force against shift fork extension 39 tending to slide the shift fork along rod 33.

Two oppositely directed actuator units 42 act against each shift fork extension 39 whereby energization of one of the pair urges the shift fork in one direction and energization of the other produces a reverse motion of the shift fork to provide for selecting the gear engagements as hereinbefore described. Suitable pneumatic control system techniques for energizing the actuator units 42 to perform selected shifts in response to movement of an operator's control lever is disclosed in co-pending application Ser. No. 801,405 of M. A. Franz et al. filed Feb. 24, 1969 for "Pneumatic Shift Control for a Mechanical Transmission" and assigned to the assignee of the present application.

To provide for the disposition of the two actuator units 42 at each shift fork where the successive shifts forks are closely spaced, the extensions 39' of the shift fork 27 and 28 are angled to opposite sides with respect to the plane defined by the axes of mainshaft 11 and shaft 33. This does not require two different shift fork configurations. Alternate ones of the shift forks are simply reversed so that the extensions 39 of adjacent shift forks are inclined to opposite sides of the central plane of the transmission as defined above. Thus, as best seen in FIG. 2, the actuators 42 associated with one shift fork 27 need not be aligned with the actuators 42' associated with the adjacent shift fork 28 thereby providing for the desired close disposition of shift forks. Thus, in general, the actuators 42 of the transmission may be arranged in two parallel columns situated on opposite sides of the central vertical plane of the transmission.

Accordingly, a transmission using the above described shift fork construction may be readily assembled using identical low cost parts for controlling all clutches. Uniform parts are suitable for repair and replacement of any of the clutch shifting mechanisms and the system is compact and does not force wide spacing of internal clutch collars.

What is claimed is:

1. In a transmission having change speed gears and a mainshaft and a plurality of shift clutch means movable longitudinally relative to said mainshaft to select speed ratios, shift mechanism comprising:
   a fork support shaft extending parallel to said mainshaft in spaced relation therefrom,
   a plurality of interchangeable shift forks slidable along said support shaft and extending from said shaft to separate ones of said clutch means, each of said plurality of shift forks being flat planar members of substantially similar configuration, and
   means for selectively moving said shift forks along said shaft to engage and disengage the associated clutch means.

2. In a transmission having change speed gears and a mainshaft and a plurality of shift clutch means moveable longitudinally relative to said mainshaft to select speed ratios, shift mechanism comprising:
   a fork support shaft extending parallel to said mainshaft in spaced relation therefrom,
   a plurality of interchangeable shift forks slidable along said support shaft and extending from said shaft to separate ones of said clutch means, wherein each of said plurality of interchangeable shift forks has a threaded opening through which said support shaft extends, said opening being of greater diameter than said support shaft, means for selectively moving said shift forks along said shaft to engage and disengage the associated clutch means,
   a plurality of sleeves slidable along said support shaft and means securing each of said shift forks to a separate one of said sleeves wherein said sleeves have external threads, each such sleeve being threadably engaged in said opening of one of said shift forks for mounting said shift fork on said shaft.

3. In a transmission having change speed gears and a mainshaft and a plurality of shift clutch means moveable in a direction coinncident with said mainshaft to select speed ratios, shift mechanism comprising:
   a fork support shaft extending parallel to said mainshaft in spaced relation therefrom,
   a plurality of interchangeable shift forks slidable along said support shaft and extending from said shaft to separate ones of said clutch means, and
   means for selectively moving said shift forks along said shaft to engage and disengage the associated clutch means,
   wherein each of said shift forks has an extension which is angled with respect to a plane defined by the axes of said mainshaft and said support shaft and which is engaged by said means for selectively moving the shift fork along said shaft and wherein adjacent ones of said plurality of shift forks have said extensions directed away from said plane at opposite sides thereof.

4. The combination defined in claim 3 wherein said means for selectively moving said shift forks along said shaft are fluid operated actuators each having a piston which may be extended therefrom by the application of fluid pressure thereto wherein said piston bears against said angled extension of the associated one of said shift fork, said actuators being arranged in at least two parallel columns situated on opposite sides of said plane.

References Cited
UNITED STATES PATENTS

| | | | |
|---|---|---|---|
| 1,207,913 | 12/1916 | Hays | 74—477 |
| 1,811,932 | 6/1931 | Hodgkins | 74—477 X |
| 2,577,019 | 12/1951 | Kesterton | 74—473 |
| 3,387,501 | 6/1968 | Frost | 74—473 X |

MILTON KAUFMAN, Primary Examiner